United States Patent

[11] 3,594,752

[72] Inventor Ahdor H. Alton
 Lake Zurich, Ill.
[21] Appl. No. 839,520
[22] Filed July 7, 1969
[45] Patented July 20, 1971
[73] Assignee Gulton Industries, Inc.
 Metuchen, N.J.

[54] CONDITION SENSING AND ALARM UNIT AND CIRCUIT THEREFOR
 20 Claims, 9 Drawing Figs.

[52] U.S. Cl. .................................................. 340/228,
 62/125, 73/342
[51] Int. Cl. ....................................................F25b 49/00,
 G08b 21/00
[50] Field of Search........................................... 340/272,
 228, 228.1, 227; 62/125, 126; 73/304 C, 295, 342,
 341; 324/51; 307/133; 200/61.05

[56] References Cited
 UNITED STATES PATENTS
 2,994,859 8/1961 Klein............................ 340/227.1
 3,220,206 11/1965 Armentrout et al. ......... 340/228
 3,381,488 5/1968 Lewis........................... 62/126
 3,512,148 5/1970 Cambill........................ 340/227

Primary Examiner—John W. Caldwell
Assistant Examiner—Scott F. Partridge
Attorney—Wallenstein, Sprangenberg, Hattis and Strampel ABSTRACT: A readily mountable self-contained temperature sensing and alarm unit having a housing adapted to be mounted on the outside of a refrigerator truck, trailer, railroad car, or other refrigerated container, the housing encasing an alarm lamp, and a temperature sensor preferably attached to the end of an elongated tubular member extending from the rear of the housing to pass through a small opening in the wall of the refrigerated container. The housing may resemble and be of a size of an automobile head light or smaller and include a light dispersing cover plate on the outer front wall of the housing occupying most of the area of the housing so the energization of the alarm lamp is readily visible from many viewing angles. Control circuitry for the alarm lamp preferably is arranged on a printed circuit board having a portion thereof cut out to enable the printed circuit board to fit substantially completely around the alarm lamp within the housing. The control circuitry responds to the temperature sensor by energizing the alarm lamp which preferably flashes on and off when the temperature sensor, which may be a thermistor, senses a temperature above a safe temperature for the product carried within the refrigerated container.

PATENTED JUL 20 1971
3,594,752
SHEET 1 OF 3
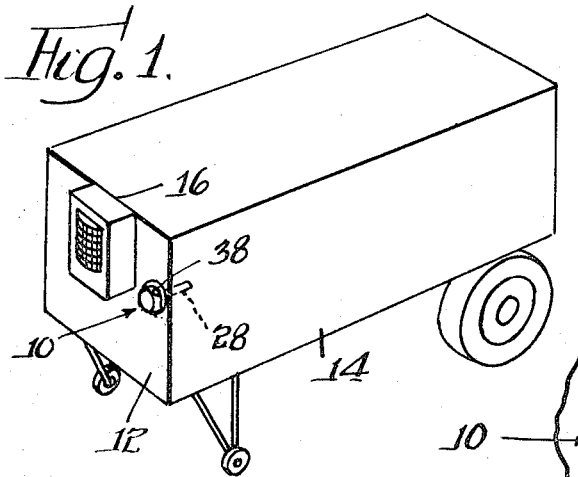
Fig. 1.
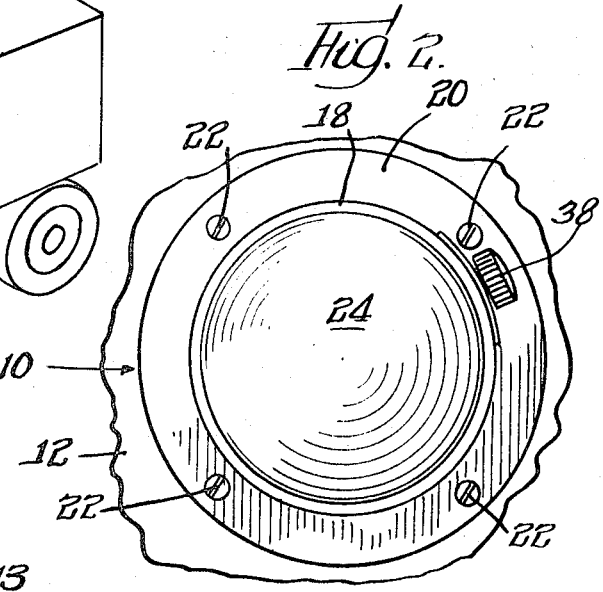
Fig. 2.
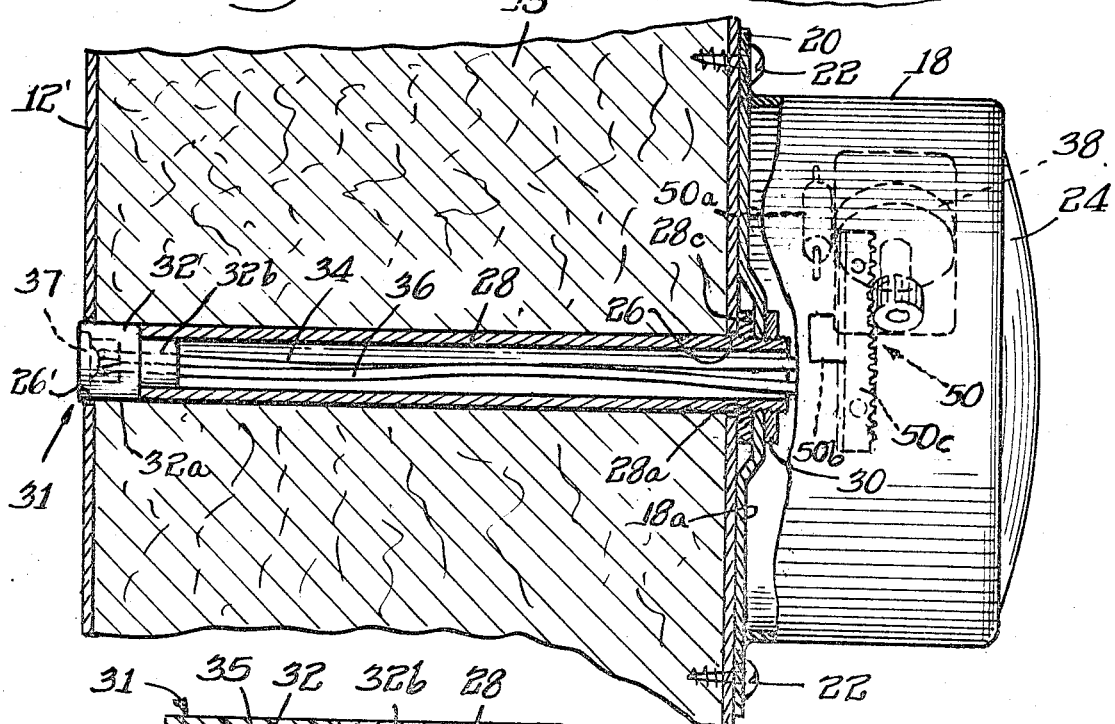
Fig. 3.
Fig. 4.
Inventor
Andor H. Alton
By: Wallenstein, Spangenberg, Hattis & Strampel
attys

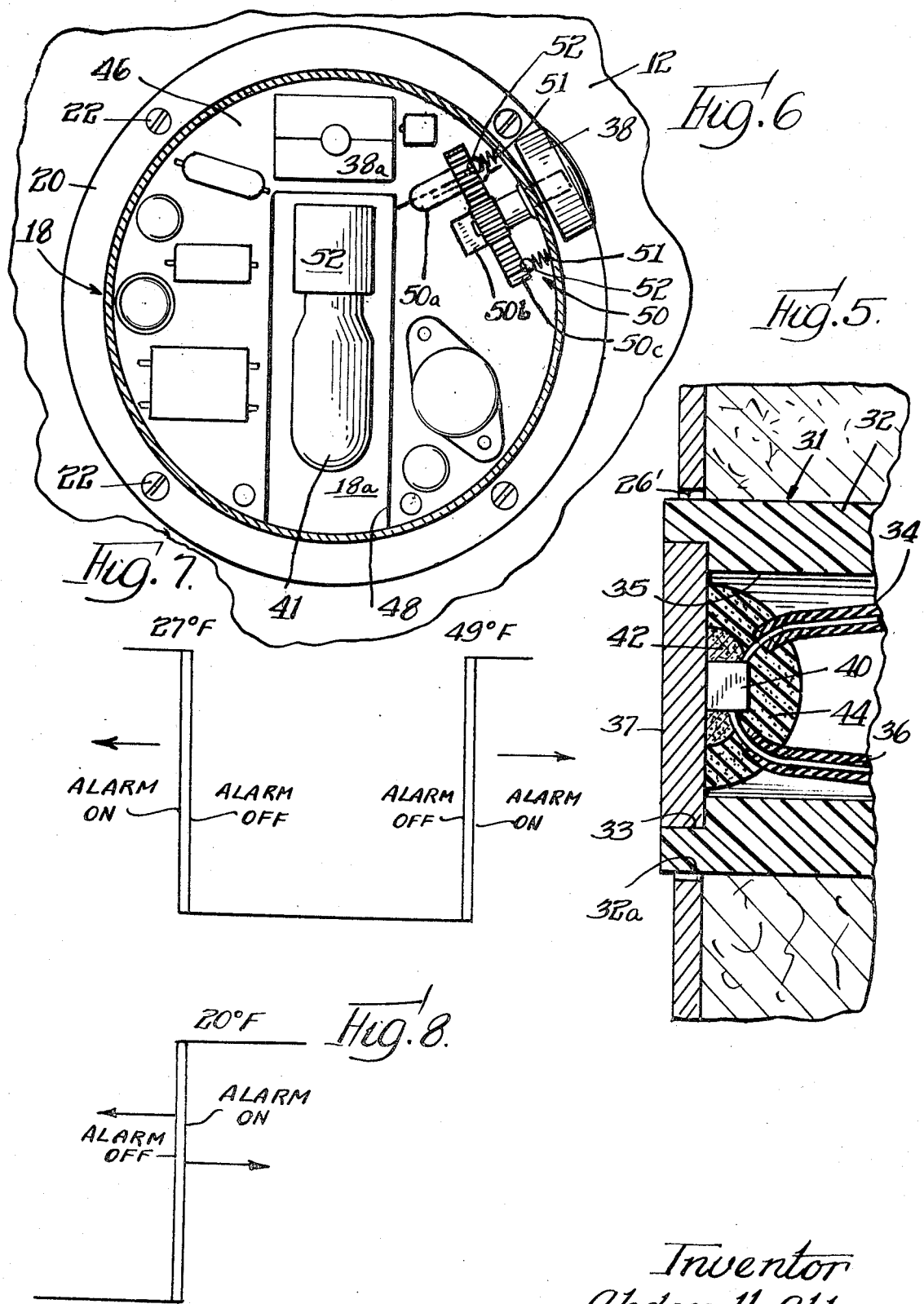

CONDITION SENSING AND ALARM UNIT AND CIRCUIT THEREFOR

This invention relates generally to condition sensing and alarm units and has its most important application for monitoring the low temperature conditions of refrigerated trucks, trailers, railroad cars and the like.

The shipment of frozen foods commonly requires the maintenance of the temperature thereof below about 20° F. and the shipment of produce commonly requires the maintenance of the temperature thereof above about 27° F. and below about 49° F. It sometimes occurs that the refrigeration equipment involved ceases to function properly and, although the insulated condition of the cars or trucks carrying the same in such case results in a slow rise in temperature, unless the trainmen or truck drivers become aware of the defective condition of the refrigeration equipment not too long after the malfunction thereof, the prolonged exposure of the food involved to temperatures in excess or below the desired temperature limits will generally result in the spoilage of the food involved. The problem of monitoring the refrigerated condition of refrigerated vehicles is a complex one for refrigerated trailers transported on flat cars and railroad box cars because there may be as many as 50 to 100 or more such vehicles in a single train and it is very difficult for a person to inspect each of these refrigerator units for proper cooling conditions.

When shipping refrigerated vehicles of the type mentioned hereinabove, such vehicles are subjected to extreme variations in temperature at the exterior thereof when transported from one geographic location to another. For example, a refrigerated container or vehicle may pass through areas where the ambient temperature is far below 0° F. and also above 100° F. as in a desert area when the sun shining on a temperature monitoring unit mounted on the outside of the vehicle can cause heating of the interior of the monitoring unit housing to temperatures well above 200° F. It is manifestly a difficult matter to design a monitoring unit to operate reliably over the wide temperature variations involved.

Accordingly, one object of the invention is to provide a low temperature monitoring unit which is readily mountable upon the outside of any refrigerated truck, trailer or railroad car and gives a readily visible indication when the temperature conditions within the vehicle involved exceeds a desired temperature limit or range.

Another object of this invention is to provide a self-contained temperature monitoring unit as described which is so mechanically and electrically designed that it can operate reliably over an extremely wide external temperature range extending many degrees below zero and well above 200° F.

A further object of the invention is to provide a temperature monitoring unit as described which can selectively monitor the temperatures required for frozen foods or chilled produce.

Briefly, the temperature monitoring unit of this invention includes a dusttight housing in which substantially all of the components of the unit are mounted, and the housing is provided with means for mounting the same, such as an apertured flange which can be anchored by screws, to the exterior surface of a refrigerated container. The housing most advantageously resembles an automobile head light housing with a light transmitting member or lens preferably covering most of the area of the front surface of the housing. Within the housing there is mounted an alarm indicating lamp which most advantageously is flashed on and off when the temperature being monitored exceeds the prescribed limit or limits involved. A temperature sensing element, like a thermistor, is carried on the end of an elongated member projecting rearwardly from the monitoring unit housing, the elongated member being insertable through a small opening drilled or otherwise formed in the sidewall of the refrigerated container so that when the monitoring unit housing is anchored upon the refrigerated container the temperature sensing element will be in temperature sensing relation with the interior of the container. Most advantageously, the temperature sensing element at the end of the elongated member is isolated from the temperatures within the monitoring unit housing by mounting the same upon a heat isolating portion of the elongated member.

The control circuitry electrically connected between the temperature sensing element and the alarm indicating lamp is preferably a transistorized circuit located entirely within the monitoring unit housing. A control switch knob on the outside of the housing can be set to provide a flashing light indication when the temperature of the refrigerated vehicle exceeds the aforesaid upper limit for frozen foods or either of the aforesaid limits for produce. The circuitry most advantageously is mounted on a circuit board which is positioned substantially to circumscribe the alarm indicating lamp.

Other aspects of the invention deal with details of the control circuitry and switch control apparatus which further enhances the reliability, simplicity and economy of the monitoring unit of The invention, The above and other objects, advantages and features of this invention will be more fully realized and understood from the following detailed description when taken in conjunction with the claims and accompanying drawings wherein like reference numerals throughout the various views of the drawings are intended to designate similar elements or components. In the drawings:

FIG. 1 is a perspective view of a truck trailer refrigerated container illustrating one kind of refrigerated container to which the temperature monitoring unit of the invention may be mounted;

FIG. 2 is a front elevational view of the temperature monitoring unit of FIG. 1;

FIG. 3 is a side elevational view of the temperature monitoring unit of FIG. 1 with parts broken away to illustrate the mounting of the temperature monitoring unit of the invention upon the truck trailer;

FIG. 4 is an enlarged fragmentary, partially longitudinal, sectional view of the rear temperature sensing element carrying end of the elongated member extending from the housing of the monitoring unit of FIG. 1;

FIG. 5 is a further enlarged sectional view of the temperature sensing element carrying end of the elongated member shown in FIG. 4 and illustrating the manner in which a thermistor is mounted thereon;

FIG. 6 is an elevational plan view of the interior of the housing of the monitoring unit showing the control circuit board therein with a cutout formed therein for providing clearance for the alarm indicating lamp;

FIG. 7 is a graphic illustration of one mode of operation of the temperature monitoring unit of the invention;

FIG. 8 is a graphic illustration of another mode of operation of the temperature monitoring unit of the invention.

Figure 9:
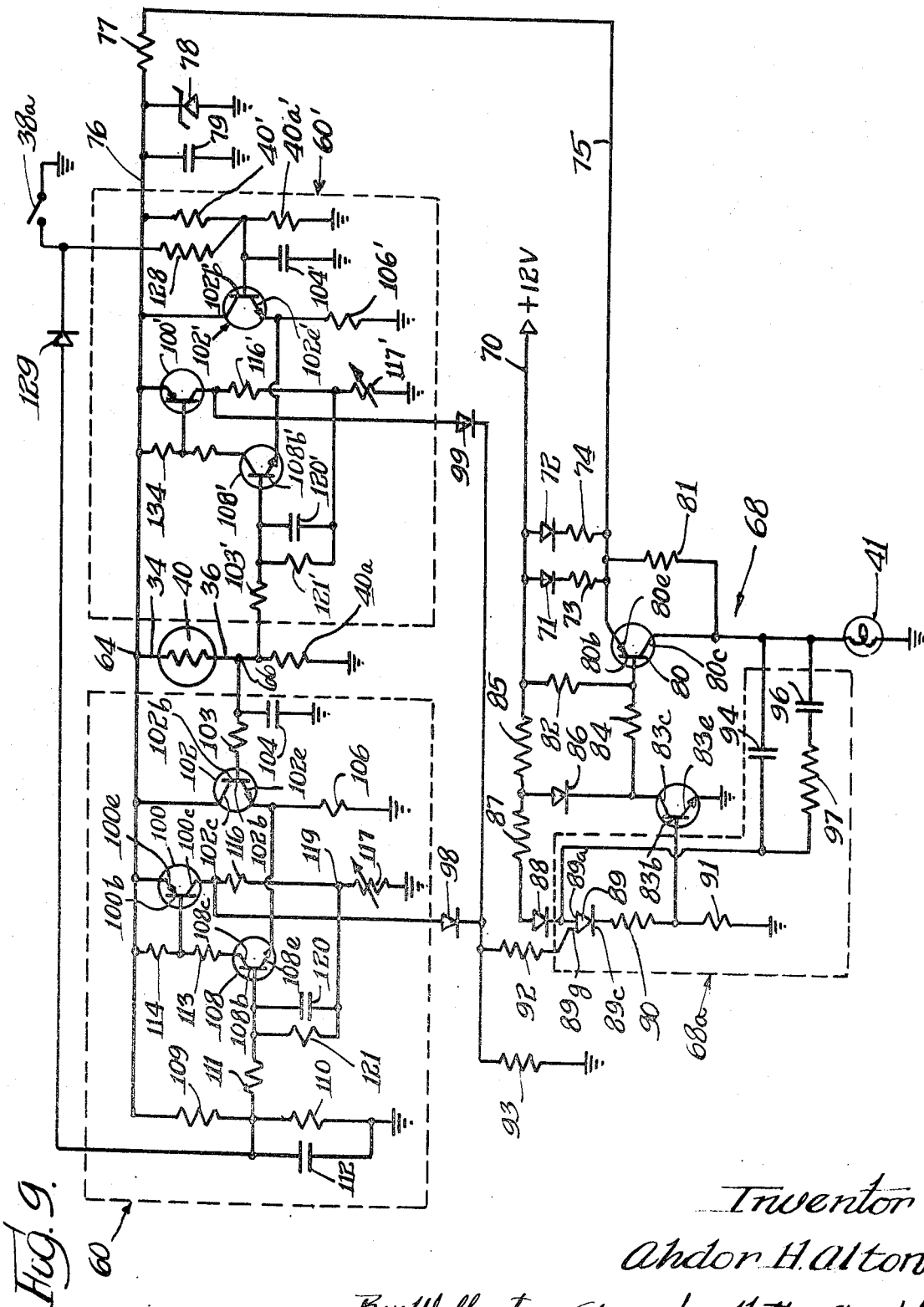
FIG. 9 is a schematic diagram of the control circuitry formed by the circuit board of FIG. 6.

Referring now to Fig. 1 there is seen a temperature monitoring unit designed generally by reference numeral 10 and mounted on the front wall 12 of a truck trailer 14 where it can be seen by the driver of a truck cab pulling the same or by a trainman in the engine or caboose of a train carrying the trailer as the train is rounding a curve. The truck trailer 14 may include a self-contained refrigerating unit 16 mounted thereon for maintaining the temperature within the trailer at a desired value or within a desired range of values.

Referring now to FIGS. 2 and 3, the temperature monitoring unit 10 is here illustrated as including a circular housing 18 resembling somewhat in size and shape an automobile headlight housing. The housing 18 includes an annular flange 20 for receiving screws 22 preferably located in opposite quadrants of the flange as here illustrated for anchoring the housing to the truck trailer. The housing 18 preferably is a dusttight housing having substantially the entire front end thereof arranged for receiving an outwardly protruding light transmitting cover preferably in the form of a concave circular lens 24 which transmits light in an arc of 180° in all planes.

The lens 24 may be of any suitable color, as for example, red, amber or green.

To mount the temperature monitoring unit 10 to the wall of the refrigerated container 14, a relatively small hole is drilled through the entire thickness of the wall. Where, as here, the wall is a double wall construction having outer and inner walls 12 and 12', holes 26 and 26' are drilled in these walls, respectively. The space between the outer and inner walls 12 and 12' is filled with suitable temperature insulating material 13. An elongated tubular member 28, or any other extended member which may be used for the same purpose, made of steel or the like, extends rearwardly from the housing 18 and is inserted through the holes 26 and 26' as the housing 18 is placed against the outer wall 12. The elongated tubular member 28 projects rearwardly from the housing a distance preferably a little less than the spacing between the walls 12 and 12' so a temperature sensing element carrying assembly 31 carried on the end thereof will be flush with or project only a small distance into the refrigerated space involved so it will not interfere with or be damaged by the articles carried within the trailer 14. The elongated tubular member 28 may be provided with a flange 28c abutting the rear wall 18a of the housing 18 and a threaded end 28a threadedly engaged by a nut 30 on the inside of the housing 18 to tighten the elongated tubular member against the rear wall 18a. The temperature sensing element carrying assembly 31 preferably carries a thermistor 40 (Fig. 5). The thermistor 40 is electrically connected by means of a pair of insulated leads 34 and 36 to an electronic circuit mounted within the housing 18, the leads 34 and 36 extending through the elongated tubular member 28. Therefore, the temperature sensed within the refrigerated environment by the thermistor 40 will supply electrical signals along the leads 34 and 36 to actuate the circuit which, in turn, energizes an alarm indicating lamp 41 (Fig. 6) or other suitable alarm indicating means within the housing 18, thus giving warning when the temperature within the refrigerated container goes beyond a desired temperature limit.

The temperature monitoring unit of the invention is capable of monitoring the two types of temperature conditions most commonly found in transportable refrigerated containers. Either one of the two modes of operation of the monitoring unit 10 is selected by means of a manually operated switch control knob 38 positioned at a convenient location on the side of the housing 18. One position of the switch control knob 38 enables the monitoring unit 10 to give warning when the temperature exceeds a given limit desired to maintain frozen products in the refrigerated truck trailer 14 in a frozen conditions, such temperature limit being, for example 20° F. In the other position of the switch control knob 38 the temperature monitoring unit 10 gives a warning when the temperature within the refrigerated truck trailer 14 respectively goes below or above given lower and upper temperature limits to maintain produce, or the like, in a chilled condition. For example, the lower temperature limit may be 27° F. and the upper temperature limit may be 49° F.

Referring now to Fig. 4, there is shown an enlarged sectional view of the temperature sensing element carrying assembly 31 fastened to the free end of the elongated tubular member 28. Preferably, the temperature sensing element carrying assembly 31 includes a hollow heat isolating member 32, for example, made of a phenolic or similar material and has a head portion 32a with a recess 33 at the end thereof for receiving a disc 37 of a material like aluminum or stainless steel which is a good conductor of heat so it follows very closely the temperature within the refrigerated environment. The head portion 32a of the hollow heat isolating member 32 fits on the end and forms an extension of the elongated tubular member 28 and terminates in a neck portion 32b which fits within and is adhesively secured to the elongated tubular member 28. As best seen in Fig. 5, the thermistor 40, or other suitable temperature responsive element, is fixedly secured to the inner surface of the disc 37 by means of a bead 42 of epoxy cement, or the like, preferably in contact only about the peripheral region of the thermistor 40. To form a seal about the thermistor 40 at the inner surface of the disc 37, a quantity of rubberized epoxy 44, or the like, is put over the thermistor 40 and the bead of epoxy cement 42, the rubberized epoxy 44 preferably being of the type which cures with the ambient atmospheric humidity. The hollow heat isolating member 32 has a central cavity 35 in which the epoxy encased temperature sensing element 40 is located. The cavity communicates with the interior of the hollow tubular member 28 to provide a passageway for the leads 34 and 36.

Reference is now made to Fig. 6 where there is shown a component receiving circuit board 46 on which substantially all of the electrical components which make up a control circuit for the alarm lamp 41 are mounted. The circuit board 46 has a cutout portion 48 formed therein to enable the circuit board to fit compactly about the alarm lamp 41 and lamp socket 52 mounted on the rear wall 18a of the housing 18. To enable the control circuit to operate reliably under the exceedingly high temperatures that can build up in the housing 18 when a hot desert sun shines on the housing, the control circuit operates at a very low current. Control switches like the switch or switches controlled by the control knob 38 cannot be ordinary unsealed contacts where the contact resistance can become appreciable because of dirty contacts or otherwise. Each such switch is most advantageously a magnetic reed switch assembly 50 having a capsule 50a containing sealed reed contacts 38a and a magnet 50b carried on an arm 50c movable between a switch opening position where the magnet 50b is spaced appreciably from the contacts within the capsule and a switch closing position where the magnet 50b is next to the contacts within the capsule 50a. Springs 51–51 carry positioning balls 52–52 which pass into holes in the arm 50c to stabilize the arm in these two positions. The control knob 38 may be geared or otherwise coupled to the arm 50c to move the same between these two switch operating positions, and any suitable means, not shown, may be provided to guide linear movement of the arm 50c and magnet 50b toward and away from the capsule 50a.

Referring now to Fig. 9 there is seen a detailed schematic diagram of the electronic circuitry which is constructed in accordance with this invention to develop alarm signals when the thermistor 40 senses a temperature value either above or below a given temperature range or when the thermistor senses a temperature value above a minimum temperature. Most advantageously the circuit of Fig. 9 is divided into low and high temperature limit controlling circuit portions 60 and 60', it being understood that either circuit portion 60 or circuit portion 60' may be used independently of the other only to sense one temperature limit. Reed switch contacts 38a are opened and closed by the control knob 38 to render the low temperature limit controlling circuit portion 60 operative and inoperative and automatically shift the high temperature limit at which circuit portion 60' will be responsive. The thermistor 40 is connected to input terminals 64 and 66 which are common to the two circuit portions 60 and 60'. The circuit arrangement of the circuit portions 60 and 60' enables a single thermistor 40 to sense temperatures and provide an alarm indication of at least three different temperature values without the need of a temperature sensing device for each temperature value sensed. The output signals of the circuit portions 60 and 60' are delivered to a control circuit 68 controllably connected to the alarm indicating lamp 41. Preferably the control circuit 68 may include a flashing circuit 68a flashingly to operate the alarm indicating lamp 41.

The exemplary preferred circuit shown in Fig. 9 is most advantageously arranged for connection to a positive voltage source which may be between 10 volts and 20 volts and preferably 12 volts in value. For this purpose a power line 70 is connected to the voltage source to apply power to a pair of parallel connected rectifiers 71 and 72 each connected in series with a current limiting resistor 73 and 74, respectively; to apply operating potential to a line 75 and therefrom to the circuit portions 60 and 60'. The rectifiers 71 and 72 are provided to prevent damage to the circuit which may result by inadvertent connection to a voltage source of opposite polarity than that required for proper operation thereof. The line 75 is connected to a distribution bus line 76 for supplying a reduced operating voltage to the circuit portions 60 and 60' through a resistor 77, and there is provided a zener diode 78 to regulate the voltage on the bus line 76. The zener diode 78 preferably limits the voltage on line 76 to a value, for example, of 6.8 volts. To prevent transient voltages from affecting the circuit portions 60 and 60', a filter capacitor 79 is connected in parallel with the zener diode 78.

The voltage developed on line 75 is also applied to the emitter electrode 80e of a PNP transistor 80 which has the emitter-collector electrodes 80e and 80c, respectively, thereof shunted by a resistor 81 which provides a small amount of current continuously to flow through the incandescent indicating lamp 41 which is insufficient visibly to light the same but is sufficient to maintain a hot current-limiting resistance value. This is important because cold incandescent filaments have a much lower resistance than hot incandescent filaments and the initial current flow through the transistor 80 could be excessive if the transistor 80 is turned on with a cold incandescent lamp in the load circuit thereof. When an associated transistor 83 is maintained nonconductive, the full voltage on bus 70 is applied to the base electrode 80b. The voltage drop across the rectifiers 71–72 and resistors 73–74 provide a reverse bias for the base-emitter junction of transistor 80 by way of resistor 82.

Transistor 83 has a grounded emitter electrode 83e and a collector electrode 83c connected to bus 70 through a rectifier 86 and resistor 83. The rectifier 86 prevents damage to the transistor 85 upon an inadvertent connection of the transistor 83 to a voltage supply of the wrong polarity. The resistor 82 together with the resistor 84 form a voltage divider network which, when the transistor 83 is conducting, lowers the voltage on the base electrode 80b of transistor 80 to render it conductive and energize the indicating lamp 41.

Connected to the junction of resistor 85 and rectifier 86 is a resistor 87 which, in turn, is connected through a rectifier 88 to the anode electrode 89a of a programmable unijunction transistor 89. The cathode electrode 89c of the programmable unijunction transistor 89 is connected in series with a voltage divider network comprising a pair of resistors 90 and 91 the juncture of which is connected to the base electrode 83b of transistor 83. During the nonconductive state of programmable unijunction transistor 89 the transistor 83 is maintained in a nonconductive state, which, in turn, maintains transistor 80 in a nonconductive state. To render the flasher circuit 68a operative, a voltage is applied to the gate electrode 89g of the programmable unijunction transistor 89 through a resistor 92, this voltage being developed across a resistor 93 as a result of output signals from either of the circuit portions 60 and 60'. Prior to rendering the programmable unijunction transistor 89 conductive, a capacitor 94 having one end thereof connected to the anode of programmable unijunction transistor 89 is charged substantially to the voltage on the power line 70, and a capacitor 96 in series with a resistor 97 is charged in like manner. Upon rendering the programmable unijunction transistor 89 conductive, capacitors 94 and 96 discharge to a value which render the programmable unijunction transistor 89 nonconductive again, this process continuously repeating itself at a frequency governed by the value of capacitors 94 and 96 and the various resistors in the circuit so long as a gate voltage is applied through resistor 92. Thus, the circuit components comprising programmable unijunction transistor 89, resistors 90 and 91, capacitors 94 and 96, and resistor 97 form a fixed frequency relaxation oscillator which continues to oscillate so long as there is gate voltage applied to the gate electrode of the programmable unijunction transistor 89 through resistor 92. However, when the flashing circuit 68a is not used, the control signals are applied directly to the base electrode 83b of transistor 83 by way of resistors 90 and 91 and the indicating lamp 41 is turned on in a steady state condition.

Operating gate potential for the programmable unifunction transistor 89 is coupled through a pair of rectifiers 98 and 99 which form an "OR" logic circuit either one of which is operative to couple a positive voltage as a result of conduction of associated PNP transistors 100 or 100' of the circuit portions 60 and 60', respectively. The transistors 100 and 100' are maintained in a normally nonconductive state until the thermistor 40 senses a temperature above or below the desired temperature limits being monitored. When this occurs, either transistor 100 or transistor 100' will become highly conductive to activate operation of the flashing circuit 68a and flashingly energize the indicating lamp 41. The thermistor 40 has a negative temperature coefficient characteristic, so an increase in temperature causes a decrease in its resistance and a decrease in temperature causes an increase in its resistance. The thermistor 40 is connected in series with a fixed resistor 40a and together therewith form a variable voltage divider network between the bus 76 and ground.

The voltage value developed at the input terminal 66 at the bottom of the thermistor 40 is applied to the base electrode $\chi b$ of a NPN transistor 102 through a resistor 103, and to the base electrode 108b' of an NPN transistor 108' through a resistor 103'. When the temperature sensed by the thermistor 40 is below a given limiting temperature, transistor 102 is biased to a relatively highly conductive condition. To prevent undesired transient voltages from affecting the operation of the circuit portions 60 and 60', there is provided a filter capacitor 104 the ungrounded end of the resistor 106 is connected to the emitter electrode of a NPN transistor 108 normally to render it relatively nonconductive. The transistor 108 is rendered relatively highly conductive to initiate a flashing light signal from the alarm indicating lamp 41 when the transistor 102 becomes nonconductive at which time the voltage at the ungrounded end of resistor 106 drops to a low control value. The base electrode 108b of transistor 108 is biased by means of a voltage divider network comprising resistors 109 and 110, the juncture thereof being connected to the base electrode 108b through a resistor 111. The resistor 110 is shunted by a series circuit comprising the resistor 111 and resistors 121 and 117 connected between the base electrode 108b and ground. The value of resistors 109, 110, 111, 112 and 117 are selected to bias the base-emitter junction of transistor 108 to a desired value which determines, in part, the temperature at which the normally nonconductive transistor 108 will be triggered into a conductive state. Resistor 117 is made variable to adjust the temperature at which the conductive states of transistor 108 and 102 reverse. A capacitor 112 is provided in parallel with the resistor 110 to filter any transients which may occur within the circuit, and a capacitor 120 is coupled across resistor 121 to speed up the triggering of the circuit. Operating potential from the bus 76 is applied to the collector electrode 108c of transistor 108 through a pair of series connected resistors 113 and 114 and the voltage at the collector electrode 108c is the voltage on the bus 76 when transistor 108 is nonconductive.

The transistor 100 is a PNP transistor having its emitter electrode 100e connected to the bus 76, its base electrode 100b connected to the juncture between resistors 113 and 114 and its collector electrode 100c connected to ground through series connected resistors 116 and 117. When transistor 108 is nonconductive, the absence of any voltage drop across resistor 114 will render the transistor 100 relatively nonconductive. Conduction of transistors 108 causes a voltage to appear across resistor 114 which will render transistor 100 highly conductive to apply an energizing voltage to the flasher circuit 68a through the rectifier 98 connected to the juncture of resistor 116 and the collector electrode 100c of transistor 100.

The circuit comprising the transistors 108, 102 and 100 and associated circuit elements form a feedback trigger circuit which may also be referred to as a differential amplifier circuit, the feedback portions thereof including resistor 106 and resistor 117. Thus, when the temperature drops below the lower limit being monitored the voltage on the base electrode 12b of transistor 102 drops to a value where the voltage drop across resistor 106 is insufficient to keep transistor 108 nonconductive. When the transistor 108 starts to conduct, the resulting voltage developed across resistor 114 causes transistor 100 to conduct. The resulting voltage drop across resistor 117 causes a positive voltage to be coupled through capacitor 120 to the base electrode 108b of transistor 108 to enhance its conduction. This feedback process regeneratively causes transistors 108 and 100 to become quickly highly conductive to a point where the voltage drop across resistor 106 from current flow through transistor 108 renders the transistor 102 nonconductive. The circuit has a hysteresis like a Schmidt trigger circuit wherein the circuit switches on and off at different values. Thus, if the circuit portion 60 being described switches to an alarm "on" condition at a given low temperature, the circuit will not switch "off" until a somewhat higher temperature is reached. The resistor 117 adjusts the width of this temperature differential or hysteresis. The hysteresis condition just described is best illustrated by FIGS. 7 and 8 wherein the double line at each of the temperature limits indicates the temperature at which the sensing and alarm unit 10 is initially energized and becomes deenergized at the upper and lower limits of the range of temperatures being monitored.

The circuit portion 60' which gives an alarm when the temperature being monitored exceeds a given upper limit is very similar to the circuit just described and corresponding circuit elements have been similarly numbered except that a prime (') has been added to each such number. Here, however, the thermistor 40 and resistor 40a are associated with the left hand, normally nonconductive transistor 108' of circuit portion 60', and effects the conduction of the transistor 108' when the temperature rises to a value where the voltage on resistor 40a rises to a value which triggers the transistor 108' into conduction which, in turn, renders normally nonconductive transistor 100' conductive and the normally conductive transistor 102' nonconductive. Since the circuit portion 60' operates in a manner similar to circuit portion 60 just described, a further description thereof will not be made.

The circuit portion 60 is rendered inoperative when frozen food temperatures are being monitored since in such case, the alarm unit monitors only an upper limit temperature (which is a different upper limit than that monitored when produce temperatures are being monitored). To this end, there is connected to the base electrode 102b' of transistor 102' a resistor 128 which, in turn, is connected to a grounded reed switch 38a which is closed when frozen food temperatures are being monitored. A rectifier 129 is connected between the juncture of resistor 128 and reed switch 38a and the base electrode 108b of transistor 108 in circuit portion 60 so closure of reed switch 38a couples ground potential to the base electrode 108b of NPN transistor 108 to render the same permanently nonconductive regardless of the conductive condition of transistor 102. Closure of reed switch 38a couples resistor 128 in parallel with resistor 40a ' coupled to the base electrode 102b' of normally conductive transistor 102' to reduce the positive forward bias voltage on the transistor so that it takes a lower voltage (i.e. a lower temperature) such as 20° F. to render the normally nonconductive transistor 108' conductive.

The invention disclosed herein thus provides a very flexible efficiently, easily mountable and reliable temperature monitoring unit to monitor both frozen food and produce temperatures within a transportable refrigerated container.

It will be understood that variations and modifications may be effected in the preferred unit described without departing from the spirit and scope of the novel concepts disclosed herein.

I claim:

1. A temperature sensing and alarm unit for sensing temperature within a refrigeration car, truck or other refrigerated container and giving an alarm indication at the exterior of the refrigerated container, comprising: a dusttight housing having means for mounting the same to an exterior surface of said refrigerated container, said housing having an opening in the front thereof; a visible alarm indicating means mounted on said housing and visible from outside of the same for giving a warning that the temperature within said container is beyond a predetermined desired temperature range; an elongated member extending from the rear of said housing and adapted to extend through a relatively small opening in said refrigerated container; a temperature responsive electrical element on the end of said elongated member to be positioned in temperature sensing relation with the environment within the refrigerated container and having an electrical characteristic which varies with temperature; electronic circuit means mounted within said housing with said alarm indicating means, said electronic circuit means having input terminals connected through said elongated member to said temperature responsive element on the end thereof and having output terminals connected to said alarm indicating means for selective energization thereof; said electronic circuit means having two circuit portions each having inputs connected in common to said input terminals and each circuit portion being responsive to a different value of said temperature responsive element, each of said circuit portions having an output connected to said alarm indicating means and both of said circuit portions being in said alarm blocking state when the value of the electrical characteristic of said temperature responsive element indicates that the temperature in the refrigerated container is within a predetermined desired temperature range, one of said circuit portions changing to an alarm energizing state when the electrical characteristic of said temperature responsive element has a value indicating that the temperature is above one of the limits of said range to give warning of such temperature, and the other of said circuit portions changing to an alarm energizing state when the electrical characteristic of said temperature responsive element is a value indicating that the temperature in the refrigerated container is below the other limit of said range, said circuit portions thus monitoring the upper and lower temperature limits of said predetermined desired temperature range.

2. The temperature sensing and alarm unit of claim 1, wherein said alarm indicating means is a lamp substantially centrally located within said housing and wherein said electronic circuit means includes components mounted on a circuit board surrounding said alarm indicating lamp, said circuit board having an opening which enables the positioning of said circuit board within said housing to substantially circumscribe said alarm indicating lamp.

3. The temperature sensing and alarm unit of claim 1, further including a manually operable selector means including a switch connected in circuit with said two circuit portions, one condition of said switch enabling said two circuit portions to be responsive to said temperature responsive elements to give warning above and below said upper and lower temperature limits, and another condition of said switch disabling said one of said circuit portions to provide only one temperature limit which is monitored.

4. The temperature sensing and alarm unit of claim 3 wherein said another condition of said switch also varies the value of the temperature responsive element which causes said other circuit portion to operate in said alarm energizing state.

5. A temperature sensing and alarm unit for sensing temperature within a refrigeration car, truck or other refrigerated container and giving an alarm indication at the exterior of the container, comprising: a housing having means for mounting the same to the exterior surface of the refrigerated container; an alarm indicating means mounted in said housing for giving a warning that the temperature within said container is above a predetermined desired temperature limit; an elongated member extending from the rear of said housing and adapted to extend through a relatively small opening in the refrigerated container; a temperature responsive element on the end of said elongated member to be positioned in temperature sensing relation with the environment within the refrigerated container; heat isolation means which is a poor transmitter of heat positioned between said elongated member and said temperature responsive means which heat isolation means isolates said temperature responsive element from said housing to reduce transmission of heat from said housing to said temperature responsive element; and circuit means connected between said temperature responsive elements and said alarm indicating means for energizing said alarm indicating means when said temperature responsive element senses a temperature above said desired predetermined temperature limit.

6. The temperature sensing and alarm unit of claim 5 wherein said alarm indicating means is a lamp, and said circuit means includes a flashing circuit for flashing said alarm indicating lamp on and off when said circuit means is energized in response to said temperature responsive element sensing a temperature above said predetermined temperature limit.

7. The condition sensing and alarm circuit of claim 5 wherein said housing is a dusttight housing having a large opening in the front thereof, said alarm indicating means is a lamp mounted behind said opening, and there is provided a light transmitting member secured to said housing covering said opening, the housing and light sensing member thereby resembling an automobile headlight.

8. The temperature sensing and alarm unit of claim 7 wherein said alarm indicating means is a lamp substantially centrally located within said housing and wherein said circuit means includes components mounted on a circuit board surrounding said alarm indicating means, said circuit board having an opening which enables the positioning of said circuit board within said housing to substantially circumscribe said alarm indicating lamp.

9. A condition sensing and alarm circuit comprising: a condition responsive element to be positioned in condition sensing relation with a variable condition environment which is to have the condition thereof monitored, said condition responsive element having an electrical characteristic which progressively varies with changes of condition, the value of said condition responsive element corresponding to the value of the condition being monitored; alarm indicating means for giving warning that the condition of said variable condition environment is beyond a given upper value or below a given lower value defining a range of condition values; and electronic circuit means having input terminals connected to said condition responsive element and having output terminals connected to said alarm indicating means for selective energization thereof, said electronic circuit means having two circuit portions each having their input in common with said input terminals and each circuit portion being responsive to a different value of the electrical characteristic of said condition responsive element, each of said circuit portions having an output connected to said alarm indicating means and both of said circuit portions being in alarm blocking conditions when the electrical characteristics of said condition responsive element has a value indicating that the value of said condition is within said predetermined range of condition values, one of said circuit portions changing to an alarm energizing state when the electrical characteristic of said condition responsive element indicates that the value of the condition is above said given upper value to give warning of such condition and, the other of said circuit portions changing to an alarm energizing state when the electrical characteristic of said condition responsive element is of a value which indicates that the value of the condition is below said given lower value, said circuit portions thus operating to monitor the limits of said predetermined desired range of condition values.

10. The condition sensing and alarm circuit of claim 9 further including selector means including a switch connected in circuit with said two circuit portions, one condition of said switch enabling said two circuit portions to be responsive to said condition responsive element to give warning above and below said upper and lower condition values, and another condition of said switch disabling said one of said circuit portions to provide only one condition value which is monitored.

11. The condition sensing and alarm unit of claim 10 wherein said another condition of said switch also varies the value at which the condition responsive element causing said other circuit portion to operate in said alarm energizing state.

12. The condition sensing and alarm circuit of claim 9 wherein said alarm indicating means is a lamp.

13. The condition sensing and alarm circuit of claim 12 further including a flashing circuit electrically interconnected between the outputs of said two circuit portions and said alarm indicating lamp to flashingly control said alarm indicating lamp when either one of said two circuit portions is energized in response to said condition responsive element sensing a condition value above or below said range of condition values.

14. The condition sensing and alarm circuit of claim 9 wherein said condition responsive element is a thermistor.

15. The condition sensing and alarm circuit of claim 9 wherein each of said circuit portions includes first and second current controlling devices interconnected to have opposite relatively highly conductive and nonconductive conditions at a given time; said condition responsive element being connected to a pair of corresponding current controlling devices of said circuit portions wherein one of said noncorresponding current controlling devices is normally in a relatively highly conductive condition and the other is normally in a relatively nonconductive condition, said condition responsive element being responsive to the condition value sensed at one end of a desired range of condition values for producing a control signal for reversing the conductive conditions of the current controlling devices of one of said circuit portions, and being responsive to the condition value at the other end of said desired range of condition values for producing a control signal therefrom for reversing the conductive conditions of the current controlling devices of the other circuit portion, said alarm indicating means being responsive to the reversal of the conductive conditions of said current controlling devices of said circuit portions by said condition responsive element for producing an alarm indication.

16. The condition sensing and alarm circuit of claim 15 wherein each of said current controlling devices of each circuit portion has a control terminal and a pair of load terminals, said noncorresponding current controlling devices of said circuit portions having their control terminals connected to said condition responsive element and their load terminals connected to a voltage source, the other current controlling devices of said circuit portions having their control terminals coupled to bias voltage sources and their load terminals connected to a voltage source, the terminals of the current controlling devices of each circuit portion being interconnected rapidly to reverse their conductive conditions when one of same is triggered into an opposite conductive condition by said condition responsive element.

17. The condition sensing and alarm circuit of claim 16 further including first means connectable to the bias voltage source of one of said circuit portions for changing the bias at the control terminal of the associated current controlling device to change the value of said one end of the range of condition values at which the conductive conditions of the associated current controlling devices reverse, and second means connectable to the other of the current controlling devices of said other circuit portion to disable said other circuit portion and render it nonresponsive to changes of said condition responsive element.

18. The condition sensing and alarm circuit of claim 17 wherein said first means is a resistor having one end thereof connected to the control terminal of one of the current controlling devices of said one circuit portion and the other end thereof connected to one terminal of a switch; and said second means is a rectifier having one of its terminals connected to the control terminal of one of said current controlling devices of the other circuit portion, and its other terminal connected to said contact of said switch, and the other terminal of said switch being connected to a point in common with the terminals of said current control devices.

19. A lamp energizing circuit comprising: an incandescent lamp to be energized by a voltage source to emit visible light therefrom, said incandescent lamp having a relatively low electrical resistance when in a cold deenergized condition and a relatively high electrical resistance when in a hot energized light emitting condition; a current controlling device having a control terminal for receiving a lamp energizing control signal to render said current controlling device conductive fully to energize said incandescent lamp to a visible light emitting condition, said current controlling device having a pair of load terminals connected in series between the voltage source and said incandescent lamp to pass light emitting energizing current therethrough; and a resistor connected to the load terminals of said current controlling device for shunting said current controlling device with a small amount of current which flows through said incandescent lamp when said current controlling device is nonconductive to maintain said incandescent lamp in a heated condition with no readily visible light emitted therefrom, so that the resistance value of said incandescent lamp is substantially increased from its normal cold resistance condition.

20. The condition sensing and alarm circuit of claim 19 further including a rectifier connected in series with the load terminals of said current controlling device and the voltage source connected thereto to prevent damage to said current controlling device by inadvertent connection to a voltage source of the wrong polarity.